United States Patent [19]

Baumann

[11] 4,050,479
[45] Sept. 27, 1977

[54] FLUID RESISTANCE DEVICE

[75] Inventor: Hans D. Baumann, Foxboro, Mass.

[73] Assignee: Masoneilan International, Inc., Norwood, Mass.

[21] Appl. No.: 693,420

[22] Filed: June 7, 1976

Related U.S. Application Data

[63] Continuation of Ser. No. 591,172, June 27, 1975, abandoned.

[51] Int. Cl.² .................. F15D 1/02; F16K 47/08
[52] U.S. Cl. .................. 138/42; 137/625.28; 137/625.3
[58] Field of Search .......... 137/625.3, 625.69, 625.28, 137/625.33, 625.37, 625.38, 625.39; 138/40–43; 181/36 R, 46, 56, 69; 251/127

[56] References Cited

U.S. PATENT DOCUMENTS

| | | | |
|---|---|---|---|
| 2,229,441 | 1/1941 | Carlson | 138/42 X |
| 3,899,001 | 8/1975 | Orme | 138/42 X |

Primary Examiner—Richard E. Aegerter
Assistant Examiner—Frederick R. Schmidt
Attorney, Agent, or Firm—Robert A. Townsend

[57] ABSTRACT

A fluid resistance device being part of a fluid system and having high resistance, fluid energy absorbing passages within the plane surfaces of equally shaped circular plates which overlap each other in a prearranged pattern, each plate consisting of equally spaced circular segments, one half of which have a number of small openings while the other half define a large opening allowing for communication in planar and perpendicular direction between said small passages in both the adjacent segments.

11 Claims, 3 Drawing Figures

FLUID RESISTANCE DEVICE

BACKGROUND OF THE INVENTION

This application constitutes further improvements in apparatus such as of my co-pending patent application Ser. No. 549,886, filed on Feb. 14, 1975, now U.S. Pat. No. 3,987,809 granted Oct. 26, 1976 and is a continuation of application Ser. No. 591,172 filed June 27, 1975 now abandoned.

This invention relates to throttling devices used as part of a pipeline or installed as part of valve throttling means, in order to reduce high static pressure of a liquid or gas without the undesirable by-products of a high aerodynamic noise level in case of a compressible fluid such as natural gas coming from a high pressure gas well, or cavitation and erosion in case of a liquid. A typical liquid pressure reducing application would be a boiler feed-water by-passing a feed-water pump under low load conditions, in order to keep the pump from being damaged. In applications like this, pressure as high as 6000 psi have to be reduced without the above mentioned adverse side effects.

Conventional devices employed for these purposes include perforated plates such as shown in U.S. Pat. No. 3,665,965, which generally perform satisfactorily. However, plates of this kind are very expensive to produce because of the fact that all of the hundreds or sometimes thousands of small holes have to be drilled, a very time consuming effort. Stampings cannot be used because the thickness of the plates has to be more than two times a hole diameter, in order to withstand the stress in the metal caused by the hydrostatic pressure acting on the plate.

My invention overcomes these difficulties by use of stamped plates requiring essentially no machining and providing sufficiently large openings to accommodate the requirements set by the stamping die in relation to the plate thickness. Yet, the throttling flow passages can be kept small and narrow to ensure high energy losses or, in the case of gases, high frequency of the produced aerodynamic noise (high frequency noise is better attenuated by surrounding pipe walls, i.e. produce less observable soundpressure levels outside of a piped fluid system). Any desired narrowness of the throttling flow passages of my invention can simply be determined by the selection of the thickness of each plate, the open segmented portions of which separate the stamped small ports and provide planary passage ways for the fluid.

Other objectives are to provide a compact fluid resistance device, which can be installed in existing piping systems by being clamped between a pair of line flanges or installed in an orifice and one whose fluid passages can easily be cleaned after being made accessible by a simple separation.

Yet, another objective is the provision of a fluid resistance device which has a relatively high flow capacity, yet offers maximum resistance. Such high flow capacity is possible with my sectioned stampings, which provide up to 50% of the stamped annular surface area as vertical passage ways.

Finally, the stacked arrangement provides great structural strength compared to that of a single thin plate, in order to withstand high pressure drops.

These and other objectives, features, and advantages of my invention will be readily apparent from the following detailed description taken in conjunction with the accompanying drawings, in which.

DESCRIPTION OF THE PREFERRED EMBODIMENT

Figure 1:
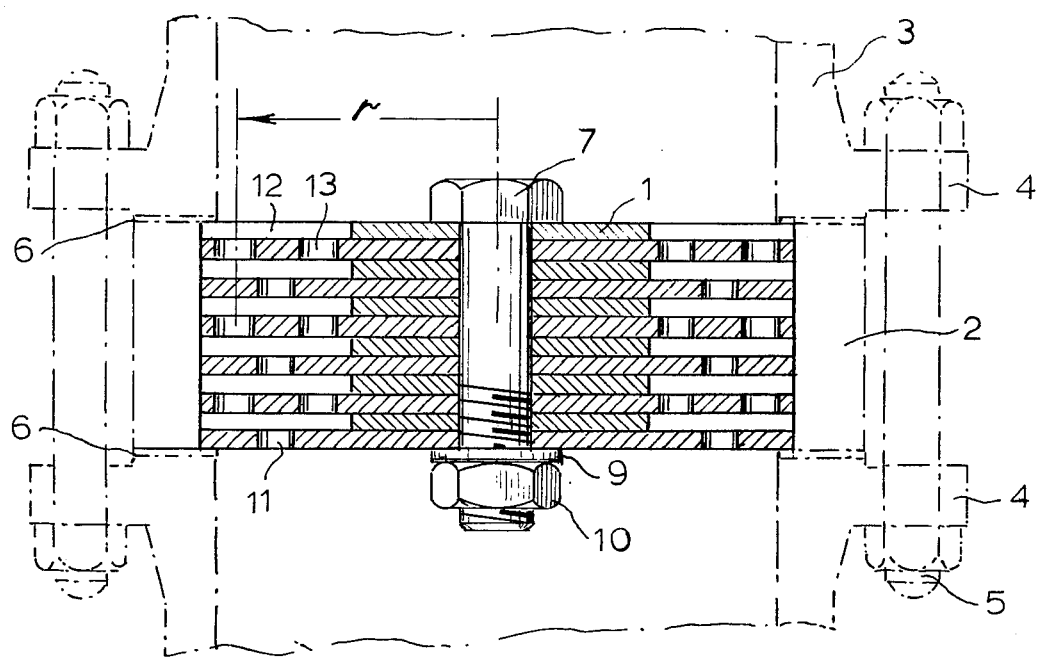
FIG. 1 is a vertical, sectional view of one preferred embodiment of my invention as part of a fluid system (shown in dashed lines) and consisting in part of a stack of prearranged plates.

Referring to FIG. 1, which shows a preferred form of my invention, suitable for throttling of high pressure fluids, comprising a number or vertical stack of identical circular or annular horizontal plates 1, being retained within a housing or orifice 2 forming part of a piping or fluid control system 3 (not part of my invention), consisting of pipe flanges 4, tie-rods 5, and sealing means 6.

All plates are retained in a preselected overlap or angular displacement pattern by a belt 7, passing through centrally located openings 8 of plates 1, a washer 9 and a hex nut 10, to form a removable subassembly.

Figure 3:
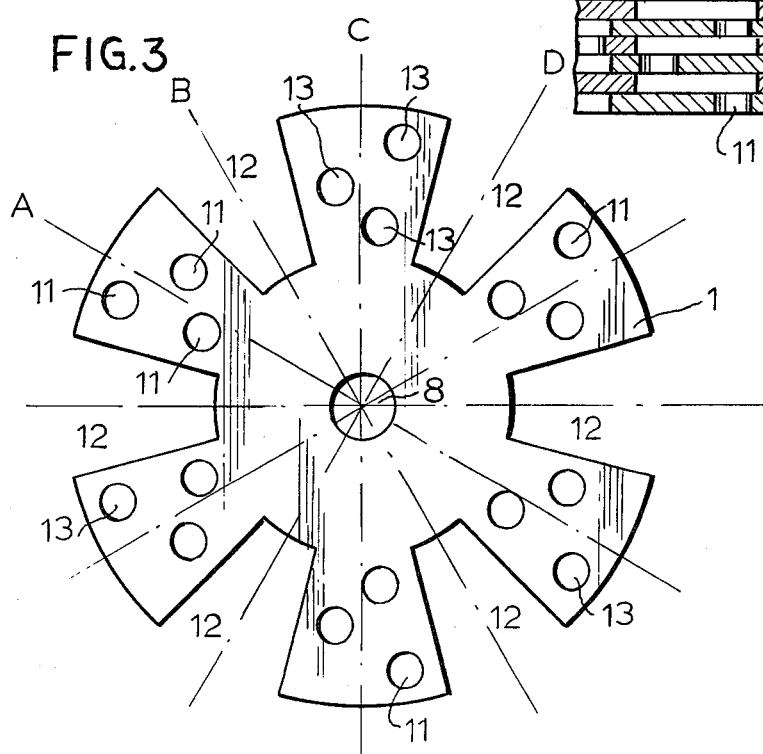
FIG. 3 is a top view of one of the plates, constituting the major part of my invention, as shown in FIG. 1.

Plates 1, one of which is more closely illustrated in FIG. 3, are subdivided into equal angular width, first and second, circle sector or wedge portions or segments, the first segments labeled A, C alternating with the second segments labeled B, D. In the plates 1, each of these segments is repeated around the circumference in an identical, herein clockwise pattern. The initial segment of the pattern, being the first segment labeled "A", shows or has a number of small perpendicular or vertical, flow throttling passages or holes 11, normally stamped into plate 1, in an arrangement or pattern certain relationship towards, or angular displacement from, the centerline of segment "A", i.e. two of holes 11 are located counter clockwise from the center line, while the third is shown in or has a clockwise rotational offset from the segment center line. The circumferentially next segment, being the second segment "B", has a large, V-shaped, perpendicular or vertical passage or opening 12 whose horizontal or cross-sectional area encompasses the area of segment "A" containing, and exceeds the combined cross-sectional areas of, holes 11. The circumferentially next segment, or first segment, labeled "C", contains the same number of holes 13 as segment "A". However, the segment C holes are arranged in a mirror image of the hole pattern of segment A, i.e. with one hole in counter clockwise rotation from center line C and with 2 holes in clockwise rotational off-set from said center line. The circumferentially next and final segment, or second segment labeled "D", repeats the shape of, or has the same large opening 12 as, the other second segment "B".

Figure 2:
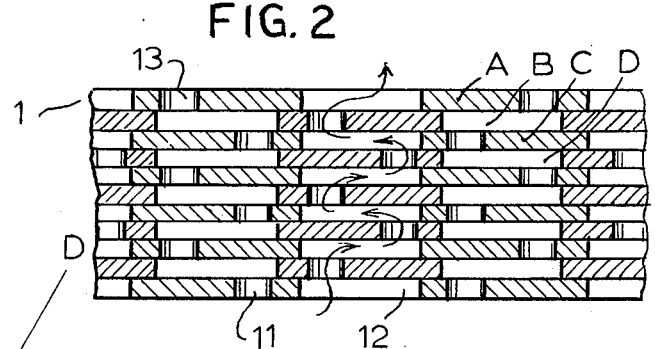
FIG. 2 is a partial development of a vertical sectional view taken around a circle described by radius "r" in FIG. 1.

When all plates are assembled, as shown in FIG. 1, they are, in the prearranged overlap pattern, successively angularly displaced towards or with respect to each other, about the perpendicular or vertical axis of the bolt 7, by the width of one segment. The segment A of one plate thereby overlaps segment B of the adjacent plate, which in turn overlaps segment C of the following plate, etc., thereby forming through the plate stack a generally perpendicular or vertical turtuous or serpentine flow pattern or passageway more clearly shown in FIG. 2, and wherein more particularly the passages of successive vertically overlying small hole segments A and C are by reason of their described mirror image patterning oppositely or clockwise-counter clockwise offset or angularly displaced with respect to each other about the vertical axis of the plate stack. While the small openings of the first segment holes or restrictions 11 and 13 permit vertical flow of fluid passing therethrough, the large openings 12 of second segments B and D allow horizontal fluid flow therewithin to permit communication between the horizontal off-set arranged sets of holes 11 and 13.

The number of restrictions for the passing fluid can be varied by selecting the quantity of vertically stacked identical plates to suit a particular requirement. The velocity head loss $h = V^2/2g$, wherein $h$ = head loss (pressure drop)
$V$ = velocity, and
$g$ gravitational constant, is approximately identical to the number of plates stacked in series, while the amount of fluid passing my invention is related to the number of holes placed in a given section multiplied by the total number of sections within each plate.

While the invention has been illustrated in a preferred arrangement contained in an orifice or pipeline, numerous changes can be made without departing from the scope of the attached claims. It is therefore possible to form the large passages in shape of a circular bore or to have each plate made in a ring shape with pie shape large flow passages penetrating sections B and D from the inside of such a ring shaped plate (instead from the outside, as illustrated). Furthermore, no limitations are placed in the number, shape or general arrangement of the small vertical passages. For example, every fourth plate of a set of plates, having segments A + C with identical hole arrangements, could simply be installed inverted from the adjacent plates to form the same serpentine flow pattern illustrated in FIG. 2.

I claim:

1. A fluid resistance device comprising:
    a vertical axis stack of coaxial, abutting horizontal circular plates,
    each plate being subdivided into first and second, wedge-shaped segments,
    at least one first segment per plate having a number of small, vertical, flow throttling holes therethrough,
    at least one second segment per plate having at least one large, vertical, flow passing opening therethrough, said large vertical opening have a cross-sectional area exceeding the combined cross-sectional areas of the small vertical holes of said at least one first segment,
    all stack plates being angularly displaced with respect to each other about the vertical stack axis so that in successive stack plates the large-opening second segments overlap the small hole first segments, and
    the small holes of successive vertically overlying small hole first segments being angularly displaced with respect to each other about the vertical stack axis whereby are provided a number of tortuous fluid passageways extending through said stack in a vertical direction generally perpendicular to the horizontal plane surfaces of said plates.

2. The fluid resistance device of claim 1, wherein the plates are identical, wherein in each stack plate the first, small hole segments are equal in width to and alternate with the second, large opening segments, wherein the hole patterns of said first, small hole segments are alternately clockwise and counter clockwise offset from the segment center lines, and wherein in said angular displacement of the plates the segments of each plate in the stack are rotated one segment width from the corresponding segments of the adjacent plate or plates in the stack.

3. The fluid resistance device of claim 1, wherein said at least one large vertical opening of said at least one second segment per plate comprises a wedge-shaped opening whose cross-sectional area encompasses the area of said at least one first segment per plate containing said small holes.

4. The fluid resistance device of claim 1, wherein said plates of said stack further have each a centrally located, circular bore.

5. The fluid resistance device of claim 1, wherein all said plates in said stack are retained and held together in said angularly displaced arrangement by a centrally located fastening device.

6. The fluid resistance device of claim 1, wherein said plates of said stack identically have around their circumference repeating patterns of equal, alternating, first and second segments.

7. The fluid resistance device of claim 1, wherein said small holes of said first segments are angularly offset from the segment center lines, and wherein circumferentially of said plates the offset hole patterning of one said first segment is the mirror image of the next first segment.

8. The fluid resistance device of claim 1, wherein said plates have first segments with small holes arranged in identical off-segment-center-line patterns, wherein in successive plates of the stack said second, large opening segments vertically overlap said first, small hole segments, and wherein every fourth plate is inverted.

9. The fluid resistance device of claim 1, wherein said plates are stamped plates.

10. The fluid resistance device of claim 1, wherein said first segment small holes permit vertical fluid flow therethrough, and wherein said large, second segment openings allow also horizontal fluid flow therewithin.

11. The fluid resistance device of claim 1, wherein said stack has structural strength to resist high pressure drops, wherein the fluid pressure reduction by said small throttling holes insures high energy losses of liquids and high frequency produced aerodynamic noise of gases, and wherein the number and size of said small holes is such as comprise, in combination with said large openings, fluid passageways occupying up to 50 per cent of the plate surface area, and thereby affords the device high flow capacity.

* * * * *

UNITED STATES PATENT OFFICE
CERTIFICATE OF CORRECTION

Patent No. 4,050,479      Dated September 27, 1977

Inventor(s) Hans D. Baumann

It is certified that error appears in the above-identified patent and that said Letters Patent are hereby corrected as shown below:

Column 2, line 24, "belt" should read --bolt--

Column 2, line 67, "turtuous" should read --tortuous--

Signed and Sealed this

Fourteenth Day of March 1978

[SEAL]

Attest:

RUTH C. MASON
Attesting Officer

LUTRELLE F. PARKER
Acting Commissioner of Patents and Trademarks